US008554234B2

(12) United States Patent
Polini et al.

(10) Patent No.: US 8,554,234 B2
(45) Date of Patent: Oct. 8, 2013

(54) METHOD AND PROCEDURES FOR AUTOMATIC CALIBRATION OF A WIRELESS COMMUNICATIONS SYSTEM SIMULATION

(75) Inventors: Gregory P. Polini, Freehold, NJ (US); Stephanie Demers, Westfield, NJ (US); Vikram Kaul, Ocean, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1217 days.

(21) Appl. No.: 12/147,072

(22) Filed: Jun. 26, 2008

(65) Prior Publication Data

US 2009/0029651 A1 Jan. 29, 2009

Related U.S. Application Data

(60) Provisional application No. 60/937,404, filed on Jun. 26, 2007.

(51) Int. Cl.
*H04W 40/00* (2009.01)

(52) U.S. Cl.
USPC ......... 455/446; 455/67.11; 455/522; 370/320

(58) Field of Classification Search
USPC .......................................... 455/68, 446, 522
See application file for complete search history.

(56) References Cited

U.S. PATENT DOCUMENTS

| | | | | |
|---|---|---|---|---|
| 5,710,758 A * | 1/1998 | Soliman et al. | ............... | 370/241 |
| 6,111,857 A * | 8/2000 | Soliman et al. | ............... | 370/254 |
| 6,292,519 B1 * | 9/2001 | Popovic | ........................ | 375/346 |
| 6,512,933 B1 * | 1/2003 | Kalofonos et al. | ............ | 455/522 |
| 6,571,104 B1 * | 5/2003 | Nanda et al. | .................. | 455/522 |
| 6,636,739 B1 * | 10/2003 | Fagen et al. | ..................... | 455/453 |
| 6,810,246 B1 * | 10/2004 | Kalofonos et al. | ............ | 455/423 |
| 6,813,479 B2 * | 11/2004 | Voyer | ............................. | 455/69 |
| 6,834,180 B1 * | 12/2004 | Marshall | ................... | 455/67.11 |
| 6,934,555 B2 * | 8/2005 | Silva et al. | .................... | 455/522 |
| 7,046,640 B2 * | 5/2006 | Silva et al. | .................... | 370/318 |
| 7,395,058 B1 * | 7/2008 | Kalofonos et al. | ............ | 455/423 |
| 8,099,098 B2 * | 1/2012 | Borst et al. | .................... | 455/446 |
| 8,391,248 B2 * | 3/2013 | Ferrato et al. | ................. | 370/335 |
| 2003/0064741 A1 * | 4/2003 | Silva et al. | .................... | 455/522 |
| 2003/0223389 A1 * | 12/2003 | Zeira et al. | .................... | 370/332 |
| 2004/0116127 A1 * | 6/2004 | Marinier et al. | ............. | 455/450 |
| 2005/0136965 A1 * | 6/2005 | Fourestie et al. | ............ | 455/522 |
| 2007/0064784 A1 * | 3/2007 | Dehghan et al. | .............. | 375/224 |
| 2007/0149186 A1 * | 6/2007 | Barbosa da Torre et al. | . | 455/423 |

OTHER PUBLICATIONS

Azman et al., CDMA Downlink Power Control Methodology for SEAMCAT (Voice Only), Oct. 29, 2003, Qualcomm for CEPT WGSE PT SE21 SEAMCAT Technical Group, STG(03)13 r1, pp. 1-12 and Appendix A.*

(Continued)

*Primary Examiner* — Nay A Maung
*Assistant Examiner* — Alejandro Rivero
(74) *Attorney, Agent, or Firm* — Philip J. Feig (57) ABSTRACT

A method of automatic calibration in which the simulation adapts itself to more closely resemble the actual network is provided. For a given network architecture and a probabilistic customer usage profile a simulation provides an estimate of key performance metrics. These simulated metrics are compared against actual measurements from the network. To the extent that they do not match within a prescribed tolerance, an iterative adaptive calibration procedure is used to perturb slightly the probabilistic model of network usage.

17 Claims, 6 Drawing Sheets

(56) References Cited

OTHER PUBLICATIONS

Khun-Jush et al., CDMA Uplink Power Control Methodology for SEAMCAT (Voice Only) Oct. 12, 2003, Lucent Technologies for CEPT WGSE PT SE21 SEAMCAT Technical Group, STG(03)12, pp. 1-12.*

SEAMCAT Upgrade 2003 Upgrade Specifications, Sep. 17, 2003, ERO & SE PT21/SEAMCAT Technical Group, STG(03)02 r4, pp. 1-24.*

* cited by examiner

METHOD AND PROCEDURES FOR AUTOMATIC CALIBRATION OF A WIRELESS COMMUNICATIONS SYSTEM SIMULATION

CROSS REFERENCE TO RELATED APPLICATION

The present invention claims the benefit of U.S. provisional patent application 60/937,404 filed Jun. 26, 2007, the entire contents and disclosure of which is incorporated herein by reference.

FIELD OF INVENTION

The present invention relates generally to automatic calibration of a wireless communications system simulation.

BACKGROUND OF THE INVENTION

Performance optimization of mobile wireless communication networks is complex and typically requires extensive offline modeling and simulation prior to deploying changes that may have unforeseen adverse effects on the live customer network. It is necessary to calibrate the simulation model against the actual network at a level of fidelity such that the engineer is confident that the simulation's response to network changes accurately reflects the results that would be experienced if those changes were deployed in an actual live network. This process is typically quite time consuming and requires significant case-by-case insight into the workings of the actual network as well as the simulation model.

BRIEF SUMMARY OF THE INVENTION

We have invented a method of automatic calibration in which the simulation adapts itself to more closely resemble the actual network. For a given network architecture and a probabilistic customer usage profile a simulation provides an estimate of key performance metrics. These simulated metrics are compared against actual measurements from the network. To the extent that they do not match within a prescribed tolerance, an iterative adaptive calibration procedure is used to perturb slightly the probabilistic model of network usage.

DETAILED DESCRIPTION OF THE INVENTION

In a mobile wireless network a service model must include aspects of geographic variability in addition to the temporal variability considered within classical traffic modeling. Network usage measurements capture well the temporal usage information within the busy hour as that is tied directly to the billing operations of a service provider. Network measurements are also available to provide insight into the time-of-day variability in traffic demand, but due to the limited resources of these monitoring systems, this information is available only at the level of precision of well defined periods of time, most commonly hourly but potentially at the sub-hour level, but certainly not descending to the per-minute level. At an even courser level of evaluation one can find information on the geographic distribution of traffic demand. This information is typically available only at the sector level, such that a user's location is known only within the precision of the size of a sector which is most cases many thousands of square meters. Except for the case of E911 calls for which specific techniques are deployed there has been in the past little incentive for service providers to track users at the sub-sector level. Indeed, such a tabulation of data would be prohibitive in size and would place extreme demands on the network to deliver it to its repository for storage and subsequent analysis. We observe therefore that the geographic density of demand is an uncertainty that cannot be easily resolved via direct measurements of readily available customer data.

It is well established in the literature that the location of terminals in a mobile wireless communication network will impact the amount of network resources needed to provide each of them service. The power required to service a user increases as a power-law of the distance from the base station. The available power at the base station becomes a limiting factor in the size of the geographic area that it is able to cover.

CDMA wireless networks are particularly sensitive to the actual user locations within a sector as all users within that sector transmit their information over the same frequency and are therefore interfering with one another. The power required to serve each user will therefore depend on the power required to serve each of the other users. The total power required will directly affect the capacity of the system and the level of service quality experienced by each of the users. As the same set of users will require drastically different forward link power allocations based on their locations within a cell, knowledge of user location is critical to creation of a simulation that calibrates well with an actual network deployment.

The geographic density of demand is therefore modeled via a probabilistic mechanism that is constrained by known network observables such as the traffic density within a sector. The difference between the actual forward link power measured in the network and the estimated total forward link power in the simulation is used a reference metric of goodness of simulation calibration. This information is made available for each carrier at each sector in the simulation. The geographic density of traffic demand is modified via a set of novel procedures to provide a simulation model that captures well this observable characterization of user location.

Figure 1:
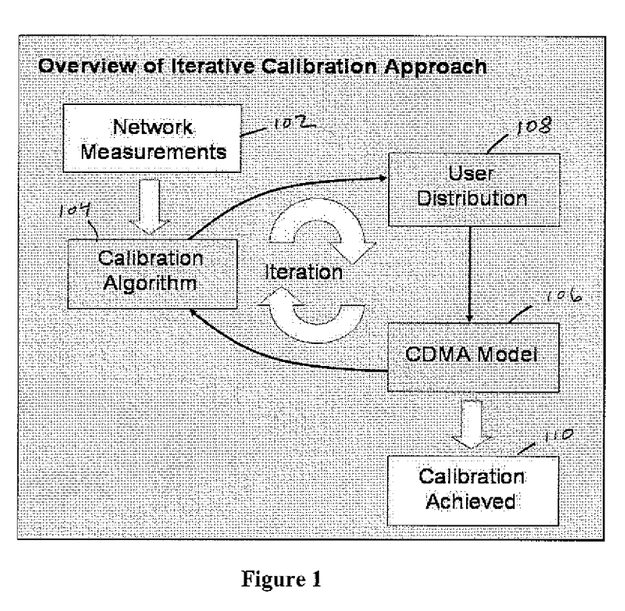
FIG. 1 depicts the process of automatic calibration of a wireless simulation model. An iterative procedure is applied to adjust the user distribution.

FIG. 1 shows the overall process used to calibrate a wireless simulation model against an actual network. Network measurements 102 drive the calibration algorithm 104 as it makes adjustments to the probabilistic model of the geographic distribution of users. The CDMA channel model 106 uses the assumed user distribution 108 as one of its key inputs. Other inputs to the CDMA model, such as channels power settings, come directly from the network but are not shown as they are not modified by the calibration algorithm. After a sufficient number of iterations the calibration algorithm determines that convergence is reached 110 and terminates the iterative procedure. The termination criterion is based on the goodness of alignment of the measured and simulated power loading on each of the sectors and carriers in the system.

Eb/No Bias Calibration

Modification of the geographic density of demand may lead to systematic biases in the loading difference between the simulation and the actual network. Because of this, geographic density adjustments are best combined with an additional technique, denoted here as "Eb/No bias adjustment."

The power required for the forward traffic channel in a wireless system depends linearly on the bit energy to noise and interference power spectral density ratio (Eb/No) required by the receiver. In a CDMA system in which the interference is dominated by users within the same cell, a required increase in Eb/No will require more than a linear increase in the power allocation of the traffic channel. The power versus quality relationship is significantly non-linear at high loads and a small increase in the Eb/No requirement may require a significant increase in power even going beyond the available power of the amplifier. Thus accurate knowledge of the Eb/No requirements is critical in a simulation of the power requirements for CDMA transmission.

It is well known that the Eb/No requirements for a given service will depend heavily on such factors as shadowing of the signal, time dispersion, doppler spread, and user mobility. Even if the actual location of all users were known, it would be difficult to produce general models that estimate the required Eb/No within more than a 1-2 dB of error. This uncertainty must be considered in the simulation model. The approach we adopt allows the calibration engine, for a fixed geographical density of demand, to choose an additive offset of the Eb/No requirements that allows for the best alignment of the measured and simulated power loads. This additive offset parameter is called the "Eb/No bias."

Figure 2:
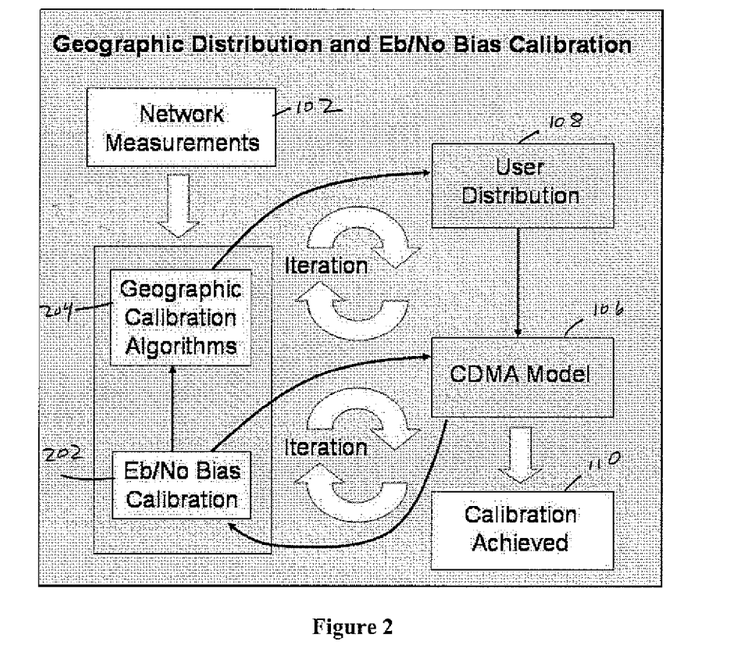
FIG. 2 depicts the decomposition of the overall calibration function into Geographic Algorithms and Eb/No Bias Calibration. Iteration on the Eb/No Bias algorithm is contained within iteration of the geographic algorithms.

For each considered geographic distribution of demand, the Eb/No bias adjustment is employed to remove systematic biases in the simulation model. FIG. 2 shows that the Eb/No bias calibration 202 is an iterative procedure contained within and needed to support a surrounding geographic distribution iteration. Several iterations of the inner loop Eb/No bias are done for each outer loop iteration of the geographic distribution calibration 204.

The definition of the alignment of measured and simulated loads has been shown to play a role in the overall goodness of the automatic calibration algorithm. Consider a group of sectors over which the calibration engine is operating. Define load to be the average fraction of the forward link amplifier power including all overhead and traffic channels. Denote as $d_i$ the difference between the simulated and measured loads at sector i. One logical choice of a metric of goodness is to minimize the absolute value of $\Sigma d_i$. It has been shown, however, that it is often better to ignore difference values that are less than a threshold, chosen appropriately to represent the statistical uncertainty of the simulation model. A good choice is to include in the sum only those difference values that are greater than 0.07 in magnitude.

Practical experience with Eb/No Bias calibration has revealed that it is not sufficient to attempt to align just the measured and simulated power loads, $L_m$ and $L_s$, respectively. Instead, the above defined procedure should be applied to calibrate scaled loads. Scaled loads are inflated versions of the loads to account for users that are blocked due to power limitations in the radio equipment. The scaled loading can be viewed as an estimate of the load that would result if the physical limitations of the equipment did not force blocking to occur. Let $B_m$ be the measured blocking in the network and $B_s$ be the blocking produced by the simulation model. The scaled loading of the actual network is defined as $L_m/(1-B_m)$ and the scaled load of the simulation model is defined as $L_s/(1-B_s)$ The recommended algorithm is to find the differences in simulated and measured scaled loads at each sector, to set to zero those results whose absolute value is less than a threshold (e.g. 0.07), and to sum the differences across all sectors. Choose the Eb/No bias that minimizes the absolute value of this result. Iterative exploration of the space of possible Eb/No bias values via bounding and bisection techniques is one possible way to achieve this.

Overview of Geographic Demand Density Adjustment Procedures

Three geographic demand density adjustment procedures are included in the automatic calibration function. In FIG. 2 they are shown together as a single box labeled "Geographic Calibration Algorithms 204." In FIG. 3 they shown separately as "Scope Calibration," 302 "Coverage Hole Calibration," 304 and "Sprinkling Calibration" 306. Unlike Eb/No Bias Calibration which feeds directly into the CDMA model 106 forming the inner loop of iteration, the three geographic calibration mechanisms feed into the User Distribution 108 function.

The suggested operation of the model is to perform the geographic calibration procedures in sequence and in the order "Scope Calibration," "Coverage Hole Calibration," and then "Sprinkling Calibration." Each of these three steps will include sufficient iterations of Eb/No bias calibration.

Scope Calibration

Network measurements are available for the number of users served by each sector. A simulation model of an actual network must instantiate users such that the known reported quantity of users are associated with the appropriate sectors. The challenge is that the geographic area of a sector is not known via readily available network measurements. Furthermore, in a CDMA wireless network the area will change based on the number of users and the locations from which they make calls. It is therefore not possible to know the actual footprint of a sector prior to instantiating all users. At the same time users cannot be instantiated until the sector footprint is known.

The typical solution to this dilemma is to provide a best guess estimate of the sector footprint and to instantiate the users under the assumption of this estimate. For many applications this level of fidelity may be sufficient, but it is not in the context of detailed network optimization. An algorithm called "Scope Calibration" is defined by which an initial estimate of each sector footprint is iteratively tuned until the resultant assignment of users to sectors agrees well with the known assignment reported by network measurements.

In "Scope Calibration" a comparison of the intended and resultant sector association for a given instantiation of users provides insight into the goodness of the process. By definition of the association, the sum of all instantiated users in all assumed scopes is equal to the sum of all instantiated users in all resultant scopes. While this is true, a particular sector may end up with less users than intended while another sector could have more users than intended. The ratio of the resultant users at a given sector to the intended number of users at that sector is a metric of goodness for scope calibration at that particular sector. The objective of scope calibration is to drive this ratio as close as possible to one at each sector in the system. It is not expected that scope calibration would achieve its objective for each random instantiation of users, but rather, the objective should be met on average when considering many random instantiations of users.

The initial scope of a sector is calculated based on the network measurements of loading at each sector and the equipment setting for the power allocation to the pilot channel. To the extent that a given instantiation of users results in simulated loading values different from those in the network, the resultant assignment of users in the simulation will differ from the initial assumed assignment. The initial assumed assignment needs to be modified such that the resultant assignment agrees with the measured results from the network. This is accomplished by perturbing the pilot measurements used to determine the initial assumed scopes. All other calculations continue to use the un-perturbed pilot measurements. If the pilot measurement is increased, the assumed scope will increase, and if the pilot measurement is decreased, the assumed scope will decrease. If one desires to decrease the number of users in the resultant scope the assumed scope should be made larger by increasing the pilot measurement such that a few users are instantiated so far from the sector that they will home instead on the adjacent sector. If on the other hand, one wishes to increase the number of users in the resultant scope, one needs to reduce the size of the assumed scope to allow users from adjacent sectors to home on this sector. The ratio of the number of users in the resultant scope to the number of users assigned in the assumed scope has been found to be an excellent means to achieve the appropriate scope modifications according to the above described operations.

Figure 4:
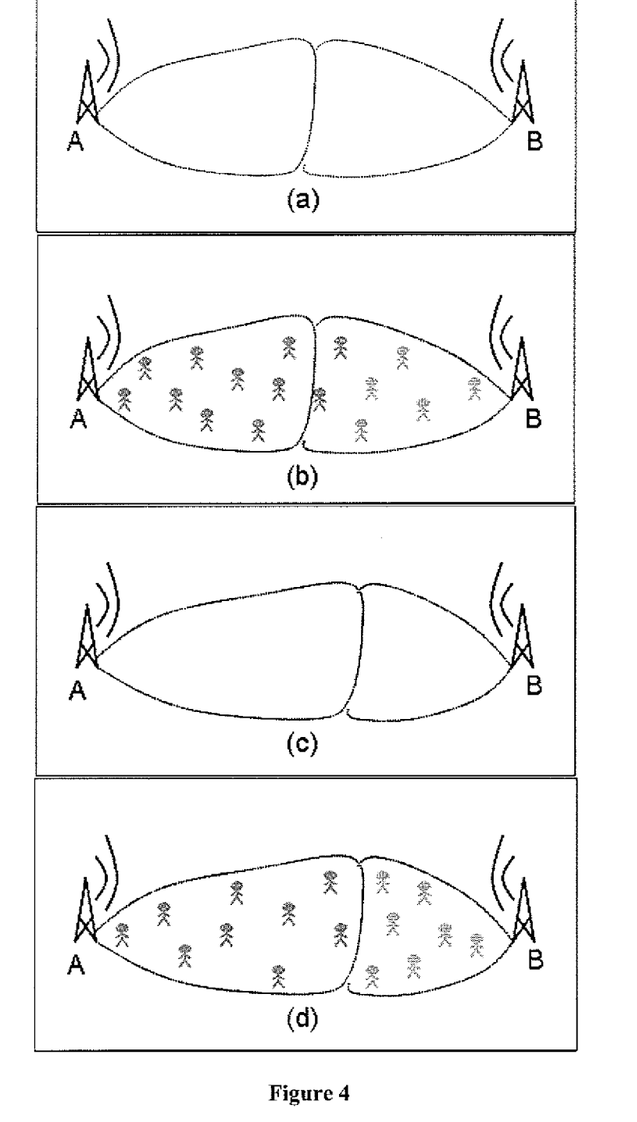
FIG. 4 depicts the sample illustration of operation of scope calibration. (a) Initial estimates of scope. (b) Nine users instantiated under assumed scope of sector A and 7 users instantiated under assumed scope of sector B. (c) Assumed scopes are adjusted to reflect resultant assignments. (d) Users are re-instantiated within the modified assumed scopes.

FIG. 4 illustrates the operation of the scope calibration algorithm. Shown in FIG. 4a are sectors labeled "A" and "B" and the assumed footprints calculated using the actual pilot levels and actual measured loads from the network. In this example, network measurements indicate that 9 users are served by sector A and 7 users are served by sector B. FIG. 4b shows a random instantiation of users satisfying this constraint. After instantiation, the CDMA model assigns users to the appropriate sectors based on the best quality of pilot criteria used within existing cellular CDMA systems. Specifically the ratio of pilot energy to noise and interference power spectral density (Ec/Io) is used. A first set of users are assigned by the model to sector A and a second set of users are assigned by the model to sector B. In total 11 users are assigned to sector A and 5 users are assigned to sector B. This differs from the intended assignment of 9 and 7 respectively and indicates a mismatch between the assumed and resultant sector footprints. According to the scope calibration procedure, a new initial assumed scope is generated in FIG. 4c. To do so, the pilot power of sector A is perturbed by the ratio of resultant to desired users assigned, in this case 11/9. At the same time the pilot power of sector B is scaled by 5/7. The net result of these two scalings is that the footprint of sector A grows and the footprint of sector B shrinks. Next, FIG. 4d shows that 9 users are instantiated in the new assumed scope of sector A and 7 users are instantiated within the new assumed scope of sector B. The CDMA algorithm then does the assignment. The result is that 9 users are assigned to sector A and 7 users are assigned to sector B. The scope calibration has succeeded in aligning the assumed scopes such that post user instantiation and detailed assignment by the CDMA algorithm, the number of users assigned to each sector agrees with the network measurements.

While in this example the exact solution is shown to be reached in a single iteration it is not in general the case. If after the first iteration further refinement is needed, a new ratio of resultant assigned users to reported users is calculated for each sector. For each sector this ratio is then multiplied by the ratio found in the first iteration step. This combined ratio is then used to scale the pilot power. As the solution gets closer and closer to perfect alignment, the change in the composite ratio for each sector will be small. Due to randomness in the user instantiation process the solution may never converge to a final single result but oscillate slightly around the final solution. Therefore a goodness of alignment criteria of the form "alignment is perfect if the difference between the intended number of users and the resultant number of users is less than 2" is a good heuristic to employ.

In practice, this algorithm has been shown to achieve much of its objective on the first iteration. It is expected to converge to a final solution in only a few more iterations. The run time cost of the subsequent iterations (linear in number of iterations) did not warrant the use of multiple iterations in the networks considered to date.

Coverage Hole Calibration

Due to the challenging nature of the wireless propagation channel, even the best design is certain to have some small isolated areas where the signal is weak and service cannot be provided. On the forward link of a CDMA system this can occur for several reasons. First, insufficient pilot energy from any sector results in poor Ec and/or poor Ec/Io coverage, Second, the Eb/No requirements of the service may require more power than the system is willing to allocate to a single device. This type of blocking is not typically seen in voice networks unless the design or parameter settings are quite poorly chosen. It is more common as a limiting factor that sets the maximum data rate that can be delivered. Third, the total power of the amplifier is finite and users are blocked when that limit is reached. Available network measurements can capture the $2^{nd}$ and $3^{rd}$ effects, but the $1^{st}$ is known only through secondary inferences such as dropped call counts, and only a fraction of these counts are attributable to poor pilot energy.

A simulation model that attempts to match an actual network deployment must accurately model the traffic channel power limited blocking effects (second and third items above) and must recognize that the reported levels of traffic, e.g. voice Minutes of Usage (MOUs), represent traffic from users that are not located in pilot signal coverage holes. All the reported MOUs must be instantiated as users within the simulation model in locations that are not coverage holes. In a CDMA wireless network it is unfortunately the case that the coverage hole locations are a function of the actual location of users being served thus it is not possible to simply modify the a-priori geographic density distribution to account for users that fall into coverage holes. Even if it were possible, or at least approximately so as would be the case for networks with few actual coverage holes, a technique which pre-adjusts the geographic density distribution suffers the limitation that it is not able to provide statistics of coverage.

A different approach was considered. To have the correct number of surviving users, it is necessary to instantiate more users in the simulation than are reported to exist in the network, such that the number of users that do not land in coverage holes in the simulation will match the actual number of users reported in the network. For each instantiation of user locations the coverage holes appear in different locations. When the coverage hole appears at a spot where there is a user, that user is dropped and the model proceeds to calculate the power requirements to serve the remaining users. This procedure will not guarantee that the correct number of users survive in each instantiation but focuses on achieving a result in which the average number of survivors across many instantiations agrees well with the network measurements.

A simple model is used to accomplish the goal of instantiating sufficient users. Assume that initially N users are instantiated in a sector and that M of them land in coverage holes such that N-M of them survive. The probability of landing in a coverage hole is then p=M/N. To have N surviving users, it is necessary to instantiate N/(1−p) users. A second instantiation is done in which N/(1−p) users are instantiated and for which the mean number of surviving users is N. There is little justification for multiple iterations of this procedure as long as the number of random instantiations used to estimate the coverage statistics is sufficiently large. As such, it is assumed that only one iteration of this procedure is invoked.

Figure 5:
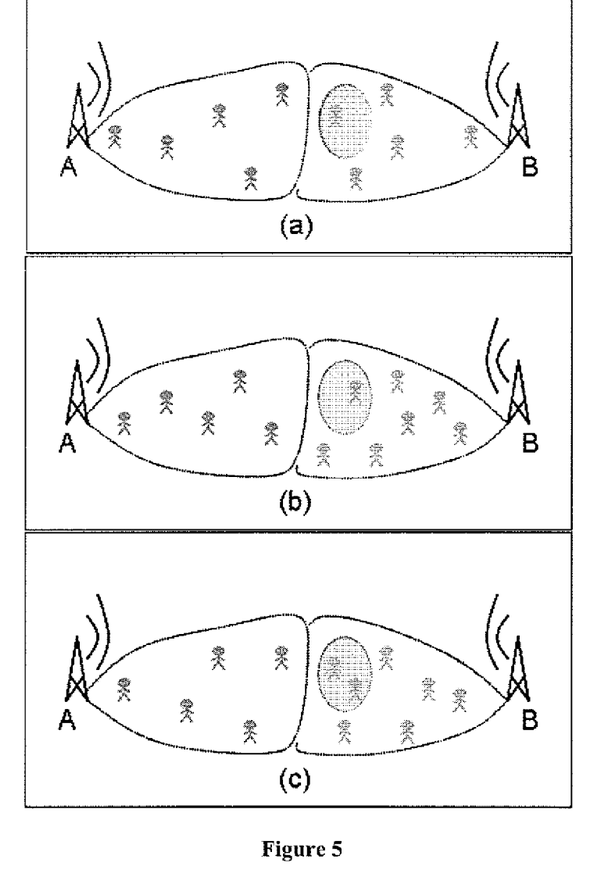
FIG. 5 depicts the sample illustration of coverage hole calibration. (a) One of the users instantiated in the footprint of sector B falls in a coverage hole. (b) Instead of instantiating 5 users, 7 are instantiated and 1 falls in the coverage hole. (c) Seven users are instantiated and 2 fall in the coverage hole.

FIG. 5 illustrates the operation of the coverage hole calibration algorithm. Shown in FIG. 5a are sectors labeled A and B which are both reported by the network as having an average load of 5 users. Based on the assumed scope 5 users are instantiated in each of the sectors. Here we assume that the resultant scope is the same as the assumed scope, that is, the CDMA algorithm assigns 5 users to Sector A and 5 users to Sector B. Shown as a oval within the footprint of sector B is a coverage hole that is assumed in this example to cover 20% of the area of the footprint of sector B. Thus, while all 5 users are instantiated in areas outside of coverage holes in sector A, only 4 users are instantiated in areas outside of coverage holes in sector B. Thus, 1 of the 5 users in sector B has landed in a coverage hole. Based on this experiment, the probability of landing in a coverage hole is ⅕=0.2. This is equal to the actual coverage hole percentage in this example. In practice, it will only be an approximation which will become close to the true value when an average is taken across many random instantiations. Indeed, when 5 users are instantiated, it is possible that 0, 1, 2, 3, 4, or 5 of them land in the coverage hole. Over many random instantiations, one will see the average number of users that land in the coverage hole. In this case, since the coverage hole is 20% of the area, and all locations are assumed to have equal probability, the average result will be 1 out of 5 users in the coverage hole.

Based on the findings from the first trial instantiation shown in FIG. 5a, a second trial instantiation of users should be done with 5/(1−0.2)=6.25 users. Since we must instantiate an integer number of users, raising this to the next higher integer yields 7 users. As for the first trial instantiation it is possible that 0 through 7 users land in the coverage hole, but on average one would expect to see 7*0.8 or 5.6 users not in the coverage hole. Note this is higher than our objective of 5 but is the best that can be achieved given the real world constraint that there is always an integer number of users. For the average number of users not in coverage hole to be 5.6 (1.2 average users in the hole), the cases with 1 or 2 users in the coverage hole would be quite common. FIG. 5b shows a sample outcome with 1 user in the coverage hole and 6 users being supported, and FIG. 5c shows a sample outcome with 2 users in the coverage hole and 5 being supported. In a practical CDMA network that carried predominately voice traffic, there will be tens of users in each sector such that the rounding issues associated with floating point averages versus an integer number of users does not prove significant.

In a single sector system, the scaling approach described above will work fine by itself. In a multi-cell network, there is an additional complexity that is made worse by the CDMA technology. In a CDMA wireless network in which the sector area is a function of the number as well as the specific location of users, the actual footprint of a sector is not known prior to the instantiation event. Recall the assumption made in the explanation of FIG. 5 in which the initial estimate of the coverage footprint is correct. If it is not, as is often the case when the model has not been preconditioned via the scope calibration mechanism, the coverage hole calibration procedure will create additional users, but those users may not all appear in the sector for which they were intended. Indeed sectors in the simulation may end up with many more than the measured number of users while other sectors in the simulation will fall significantly short of the measured number of users. Experience on actual customer data has verified that prior to application of coverage hole calibration, it is therefore necessary to have a good working estimate of each sector's individual footprint. This can be accomplished via the scope calibration procedure.

Figure 6:
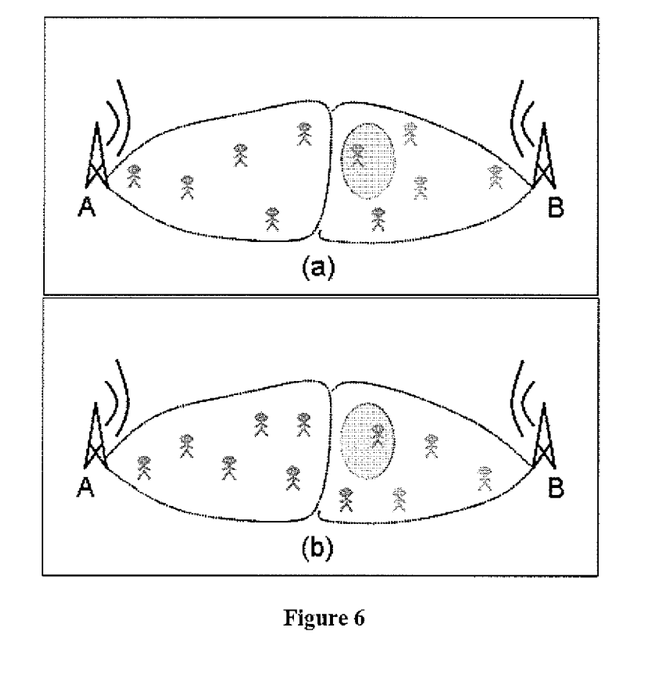
FIG. 6 depicts the demonstration that correct operation of coverage hole calibration requires good scope calibration as a starting point. (a) Five users are instantiated in each of the two sectors while the CDMA algorithm subsequently assigns 7 to sector A and 3 to sector B, a case of poor scope calibration. (b) The coverage hole algorithm increases the number of users to instantiate in sector A by one and instantiates 6 users in sector A and 5 users in sector B. Although the total number of surviving users converges to the objective of 10, the resultant assignment is made worse as measured as the sum of the absolute values of the differences away from the objectives at each of the sectors.

FIG. 6 demonstrates that coverage hole calibration is not effective unless scope calibration has been achieved. FIG. 6a shows 5 users instantiated under sector A and 5 users instantiated under sector B. The users are shown in the same locations as they were in FIG. 5a to make comparisons easier. The difference is that in FIG. 6a the resultant footprint is different from the initially assumed footprint and two of the users that are instantiated within the footprint of sector B are subsequently assigned by the CDMA model to sector A. The net effect of this is that although 5 users are instantiated in each of the sectors, in the resultant assignment, 7 are associated with sector A and 3 are associated with sector B. Furthermore the coverage hole is now within the resultant footprint of sector A. The bottom line of all of this is that while the goal was to instantiate 5 users in each of the two sectors, the final results post assignment and neglecting users that fall into coverage holes is that 6 are associated with sector A and 3 are associated with sector B.

The probability of a coverage hole in sector A is found to be the ratio of the number of users that land in coverage holes to the number of users assigned to that sector and is equal to ⅐ in this case. This implies that the second instantiation of users should be done with 5/(1−(⅐))=5.83 users. Raising this to the next integer, FIG. 6b shows 6 users instantiated in the coverage footprint of sector A and 5 users instantiated in the coverage footprint of sector B. Post application of the CDMA model, 8 users are assigned to sector A and 3 users are assigned to sector B. As before, 1 of the users assigned to sector B lands in the coverage hole. This implies that while the goal was to improve on the previous assignment, due to poor scope calibration, the coverage hole calibration made things worse resulting in 7 users associated with sector A and 3 users associated with sector B. The shortage of users in sector B was not reduced and the excess of users in sector A was increased. It is notable, however, and always the case, that the total number of users in the system was made correct by application of the coverage hole algorithm.

The combination of scope and coverage hole calibration has been shown to provide a robust solution that provides an estimate of coverage holes, instantiates the correct number of users in locations that do not fall into coverage holes, and assigns the correct number of users to each of the sectors. As a result of this, the estimated power loading of the simulation shows significant improvements in terms of agreement with actual network measurements.

Sprinkling Calibration

A set of user instantiations that satisfy both the scope and coverage hole calibration steps may still produce power loading results in simulation that differ significantly at one or more sectors from the measurements reported in the actual network. The network wide average of the measured and simulated loads will be forced to agree by the Eb/No bias calibration, in most cases the correct number of users will home on each sector due to scope calibration, and in most cases sufficient users will have been sprinkled to provide a good estimate of the coverage statistics and to have the correct number of survivors to contribute to the desired level of network load. Even with all three of these constraints, there still remains sufficient freedom to choose geographic distributions which yield very different loading results. We define "Sprinkling Calibration" as an iterative vehicle that explores partially the space of geographic distributions to better align the simulated and measured loads while satisfying the constraints posed by the other calibration mechanisms.

Sprinkling calibration operates on the general principle that if users are instantiated closer to the base station than less power will be required to serve them and the overall power loading of the sector will be reduced. Similarly, loading can be increased by moving users further from the base station. This can be accomplished by incremental iterative changes to the geographic distribution that either favor near or distant locations.

Distance is measured not in terms of physical distance but in terms of the signal strength received at a particular location. While it is generally the case that physically closer locations exhibit stronger signals, there are sufficient counter-examples due to terrain irregularity and statistical variations. In a CDMA network, the quality of the pilot signal (Ec/Io) is an appropriate choice of a physical measurement to use to determine the relative distance of a set of locations from a base station.

When instantiating a user in a simulation model within the footprint of a sector, one must choose randomly amongst a finite set of physical locations, denoted here as bins. The mathematical description of a model to represent the geographic distribution of users is now given. Each bin i has associated with it a probability $p_i$ of a user being sprinkled into it such that the sum of the probabilities across all of the bins within a sector's footprint is one. When there are N bins in a sectors footprint, and there is no other information available to indicate otherwise, a good choice for the probability of assigning a user to a bin is to make them equally likely as $p_i = 1/N$. It is important to note that the sprinkling calibration algorithm does not depend on the initial probability assignment to the bins, but an initial assignment probability must exist and can be chosen according to good engineering judgment.

The set of bins can be rank ordered according to a criteria such as the Ec/Io ranking suggested above. Assume that the bins are numbered such that the Ec/Io of bin i is always greater than or equal to the Ec/Io of bin i+1. Sprinkling calibration will alter the geographic distribution represented by the probabilities $p_i$ by multiplicative application of weights $w_i$ subject to the constraint $k \Sigma w_i p_i = 1$. When this is done the new weight of a bin i is given as $k w_i p_i$. A simple example is given to make this clear. Let there be 4 bins under a sector (there are often 100 s but the number 4 is chosen to make the example short). Further assume that the probabilities were equally likely such that $p_i = 0.25$. Next assume that the weights to be applied were $w_i = i/4$. Since $\Sigma w_i p_i = 5/8$, it is necessary that $k = 8/5$. The reason for this choice of weighting will become apparent in the discussion that follows.

It is the role of sprinkling calibration to apply an appropriate choice of weights $w_i$ to the geographic density probabilities $p_i$ to achieve the goal of increasing or decreasing the loading of a sector. Given that the bins are ordered according to the Ec/Io ranking criteria suggested above, the following observations can be made. To increase the loading of a sector, apply an increasing sequence of weights $w_i$ such that $w_{i+1} \geq w_i$ in order to make it more likely for a user to be instantiated further from the base station. (Note the equation represents a non-decreasing sequence while the text indicates increasing. While two adjacent weights in the sequence may be the same, all weights must not be the same.) To decrease the loading of the base station, choose $w_{i+1} \geq w_i$ to instantiate users closer to the base station. For the case of N bins in a sector footprint, the simplest function to meet these needs is a linear form. When it is desired to increase loading one can use $w_i = i/N$, and when it desired to decrease loading one can use $w_i = (N-i+1)/N$ where i can take on values from 1 through N inclusive. While many such functional forms exist, operation of the sprinkling calibration procedure does not depend upon a particular choice of weighting functions.

Convergence speed of the sprinkling calibration will depend on the choice of weights. Experimental investigations have shown that the choice of weights should depend on the extent of the change in loading that is desired. If the simulated load is close to the measured load, a relatively mild (flat) functional form for the weights is suggested, while to correct significant mismatches between the simulation and the measurements a much more aggressive (steep) functional form for the weights is required. It is suggested that to increase load one should use a form $w_i = (i/N)^\alpha$, and to decrease load one should use a form $w_i = ((N-i+1)/N)^\alpha$, where the exponent $\alpha$ is chosen based on the goodness of alignment between the simulated and measured power loading data.

Typical values for the $\alpha$ parameter are now given. Denote as $\delta$ the fractional difference between the simulated and measured power loading such that $\delta = 1$ implies that the simulation agrees exactly with the measurements and $\delta = 1.2$ implies that the simulation exceeds the measurements by 20%. The following tabulation considers values for $\delta \geq 1$. If $\delta < 1$, look up the value in the table for $1/\delta$. For $1.00 \leq \delta \leq 1.03$, $\alpha = 0$. For $1.03 < \delta \leq 1.10$, $\alpha = 0.1$. For $1.10 < \delta \leq 1.25$, $\alpha = 1.0$. For $1.25 < \delta \leq 1.50$, $\alpha = 5.0$. For $1.50 < \delta$, $\alpha = 10.0$. While it has not been shown that these choices are optimal, practical usage of this procedure has shown that these numbers work fine. At the same time poor choices of the numbers in these relationships will make the procedure fail. Therefore these numbers are included as an example to show that appropriate choices do exist which enable correct operation of the procedure.

Application of sprinkling calibration with Ec/Io ordering as described above is generally effective at reducing the load in a sector but sometimes failed to increase the load. This was attributed to the existence of the soft handover region. Even though users in the soft handover region are further from the sector in terms of the Ec/Io criteria, due to the macrodiversity gain of soft handover, they may be able to be served with less power than they would have if they were in closer to the sector but not within the soft handover region. A calculation of the traffic channel signal to interference ratio (SIR) delivered to a bin can be used to appropriately model the gains associated with the soft handover region. This is accomplished by modeling the geographic extent of the soft handover region using the EC/Io criteria. For bins within the soft handover region the SIR to each of the sectors in the active set is calculated and summed. This is consistent and appropriate for the maximal ratio combining techniques employed by CDMA systems to combine multiple signals when in soft handover.

To include the effects of the soft handover region on the traffic channel power requirements the ordering criteria used for sprinkling calibration is enhanced as follows. When the objective is to reduce the power loading, the Ec/Io or the SIR ordering can be used. Our initial implementation was based on Ec/Io ordering. When the objective is to increase the power loading, the SIR ordering is used. The result of this is that when the system tries to increase the power loading it sprinkles users in the locations where they would require more power but these locations are not always those that are furthest from the base station as measured by the Ec/Io criteria. The use of separate criteria for increasing or decreasing load has been shown on actual network data to provide a robust solution.

Application of sprinkling calibration as described above has been shown to result in changes to the soft handover statistics of the simulation model. This is easily explained in terms of the mathematical notation used to describe the geographic distribution modifications. As before, let $p_i$ be the probability of a user being sprinkled in a bin i. Assume that the goal is to reduce loading in this sector and that the indices i are ordered according to the Ec/Io criteria. Assume that the soft handover region is such that all bins for which i<j are not in soft handover. The probability of being in soft handover is therefore the sum of all $p_i$ for which i≥j. (Note that the transition is not so sharp in practice and one would expect to see a region in the Ec/Io sorted list where the bins alternate randomly from being in and out of the soft handover region. It is not necessary to develop complex notation to represent this level of detail to make the point of this development so instead the simpler case is described.) Application of a non-increasing weight series $w_i$ to the location probabilities will reduce the probability of being in soft handover according to the definition provided here. Thus the sprinkling calibration model when applied to reduce the load will also reduce the soft handover percentage. On the other hand when the sprinkling calibration model is applied to increase the load, there is a tendency, but not a guarantee, to increase the soft handover percentage. If the Ec/Io criteria was employed when growing load instead of the SIR criteria there would be a guaranteed increase in the soft handover percentage.

Alignment of the soft handover percentage between the simulation and the network is another valuable technique to further reduce the space of uncertainty when choosing appropriate geographic density distributions. This is easily done as follows. Assume that the sum of bin probabilities within the soft handover region is $P_{sho}$. If the network measurements indicate the probability of being in soft handover is $N_{sho}$, apply the following scalings. Multiply the probabilities of the bins within the soft handover region by $N_{sho}/P_{sho}$, and multiply the probabilities of the bins not within the soft handover region by $(1-N_{sho})(1-P_{sho})$. The following simple example with 4 bins illustrates this operation. Let bins 1 and 2 be within the soft handover region with $p_1=0.1$ and $p_2=0.2$ so that $P_{sho}=0.3$. Let bins 3 and 4 be outside the soft handover region with $p_3=0.3$ and $p_4=0.4$. Assume that the network reports the soft handover probability as $N_{sho}=0.6$. The ratio $N_{sho}/P_{sho}=0.6/0.3=2$ indicates that the bin probabilities of bins 1 and 2 should be changed to $p_1=0.2$ and $p_2=0.4$ respectively. Also the ratio $(1-N_{sho})/(1-P_{sho})=0.4/0.7=4/7$ indicates that the bin probabilities of bins 3 and 4 should be changed to $p_3=0.3*(4/7)$ and $p_4=0.4*(4/7)$ respectively.

Application of the soft handover fraction calibration procedure after each and every modification of bin probabilities during sprinkling calibration will align the simulated and measured soft handover statistics. In addition, as the statistics may not be aligned upon entry to the sprinkling calibration procedure, the first iteration of sprinkling calibration should consist solely of a soft handover alignment step. The CDMA model will then calculate the loading values prior to any further modification of the probabilities.

As sprinkling calibration is not a single step procedure, multiple iterations are necessary to achieve a good match between the measurements and the simulation. As the alignment improves less dramatic steps are taken.

What is claimed is:

1. A method for automatically calibrating a wireless CDMA-based simulation model against an actual wireless network comprising:
   (a) estimating the initial footprint of each sector in the simulation model based on actual wireless network measurements of loading at each sector and actual wireless network equipment settings for power allocation to a pilot channel at each sector inputted from the actual wireless network;
   (b) determining an intended number of users at each sector based on reported level of traffic at each sector in the actual wireless network;
   (c) creating random instantiations of the intended number of users in each sector initial footprint in the simulation model;
   (d) determining a resultant power loading in each sector averaged across distributions of the instantiations of users;
   (e) determining a number of surviving users in each sector averaged across distributions of the instantiations of users;
   (f) adjusting bit energy to noise and interference power spectral ratio (Eb/No) requirements with an additive offset Eb/No bias;
   (g) performing step (d) through (f) repeatedly until convergence is reached;
   (h) adjusting a geographic distribution of traffic demand in each sector in the simulation model; and
   (i) performing step (a) through (h) repeatedly until convergence is reached.

2. The method as set forth in claim 1, where step (f) comprises performing the step of: selecting an Eb/No bias to minimize the absolute value of the sum of differences in simulated and measured scaled power load at each sector where the scaled power load is the average fraction of forward link amplifier power inflated to account for users that are blocked due to power limitations in the radio equipment.

3. The method of claim 2, wherein the sum of differences in simulated and measured scaled power load at each sector comprises: including only those sectors for which the absolute difference values in measured and simulated scaled power load are greater than a predetermined threshold.

4. The method as set forth in claim 1, where step (h) comprises performing the step of: adjusting the estimated footprint of the sector by perturbing the power allocation of the pilot channel in each sector solely for the purpose of estimating a new footprint of the sector in the simulation model, by an amount equal to the ratio of number of users in the resultant footprint of the sector to the intended number of users reported from network measurements from the actual wireless network.

5. The method of claim 4, further comprising: meeting the ratio of the resultant users at a given sector to the intended number of users at that sector on average when considering random instantiations of users.

6. The method of claim 4, further comprising: repeating the perturbing the power allocation of the pilot channel in each sector solely for the purpose of estimating the new footprint of the sector in the simulation model, until the difference between the intended number of users reported by network measurements in the actual wireless network and the resultant number of users in the simulation model in a sector is less than a predetermined threshold.

7. The method as set forth in claim 1, where step (h) comprises performing the step of: compensating for users falling in coverage holes within a resultant sector footprint by instantiating $\lceil N/(1-p) \rceil$ integer number of users in the resultant sector footprint instead of N users to align the number of surviving users that do not land in coverage holes in the simulation model with the intended number of users reported in the actual wireless network in a sector, where the probability p is equal to the ratio of the number of users that land in coverage hole (M) over the number of users initially instantiated in the resultant sector footprint (N) in simulation model.

8. The method of claim 7, further comprising: aligning the average number of survivors across the random instantiations of users with the intended number of users reported from actual wireless network measurements.

9. The method as set forth in claim 1, where step (a) comprises performing the steps of:
   (a.1) dividing the footprint of each sector into a finite set of physical location denoted as bins, and
   (a.2) associating an initial probability $p_i$ of a user being instantiated into each bin i of a sector's footprint such that the sum of the probabilities across all of the bins within a sector's footprint is one.

10. The method as set forth in claim 1, wherein step (c) comprises:
   (c.1) creating random instantiation of users in a simulation model within the footprint of each sector according to the initial probability $p_i$ of each bin i within the sector's footprint.

11. The method as set forth in claim 1, where step (h) comprises performing the steps of:
   (h.1) ordering the bins of each sector using a bin ranking criteria such that the pilot signal of bin i is always greater than or equal to the pilot signal of bin i+1;
   (h.2) creating a sequence of weights $w_i$; and
   (h.3) altering the geographic distribution of traffic demand by multiplying the probabilities $p_i$ by weights $w_i$ along the ranked ordered bins subject to the constraint $k \Sigma w_i p_i=1$ with the new probability of a bin i given as $k w_i p_i$, where k is a constant calculated to meet constraint $k \Sigma w_i p_i=1$.

12. The method as set forth in claim 11, wherein step (a) further comprises:
   (a.1) ordering the bins in each sector based on either the pilot channel chip energy to interference ratio (Ec/Io) or the traffic channel signal to interference ratio (SIR) to reduce power loading of a sector, and
   (a.2) ordering the bins in each sector based on SIR to increase the power loading of a sector.

13. The method as set forth in claim 11, wherein step (b) comprises:
   (b.1) applying an increasing sequence of weights $w_i$ to the ranked ordered bins such that $w_{i+1} \geq w_i$ to increase the loading of a sector in the simulation model by instantiating users further away from a base station, and
   (b.2) applying a decreasing sequence of weights $w_i$ such that $w_{i+1} \leq w_i$ to decrease the loading of a sector in the simulation model by instantiating users closer to the base station.

14. The method as set forth in claim 13, wherein step (b.1) further comprises: using a form $w_i=(i/N)^\alpha$, where i can take on values from 1 through N inclusive, for a sector footprint of N bins and an exponent a chosen based on a goodness of the alignment between the simulated and measured power loading data.

15. The method of claim 11, further comprising: repeating the creating of random instantiation of users in a simulation model within the footprint of each sector according to the new probability $k w_i p_i$ of each ranked ordered bin i, reordering the bins using a bin ranking criteria, creating a sequence of weights $w_i$, and altering the geographic distribution of traffic, the repeating being continued until convergence is reached.

16. The method of claim 11, further comprising: aligning a soft handover percentage between the simulation model and the actual wireless network.

17. The method of claim 16, further comprising: multiplying the probabilities of the bins $p_i$ within the soft handover region by $N_{sho}/P_{sho}$, and multiplying the probabilities of the bins not within the soft handover region by $(1-N_{sho})/(1-P_{sho})$ if the network measurements indicate that the probability of being in soft handover is $N_{sho}$ and the sum of bin probabilities within the soft handover region is $P_{sho}$.

* * * * *

UNITED STATES PATENT AND TRADEMARK OFFICE
CERTIFICATE OF CORRECTION

PATENT NO. : 8,554,234 B2  
APPLICATION NO. : 12/147072  
DATED : October 8, 2013  
INVENTOR(S) : Polini et al.

Page 1 of 2

It is certified that error appears in the above-identified patent and that said Letters Patent is hereby corrected as shown below:

On the Title Page, Illustrative Figure, for Tag "202", in Line 1, delete "EbNo" and insert -- Eb/No --, therefor.

In the Drawings

Figure 3:
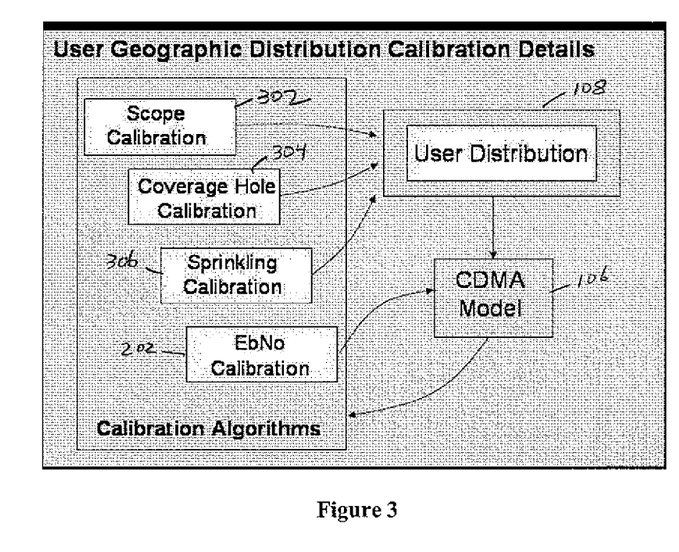
FIG. 3 depicts the four heuristic algorithms that together compose the automatic calibration process.

In Fig. 3, Sheet 3 of 6, for Tag "202", in Line 1, delete "EbNo" and insert -- Eb/No --, therefor.

In the Specification

In Column 1, Line 67, delete "2 fall" and insert -- 2 falls --, therefor.

In Column 4, Line 19, delete "$L_s/(1-B_s)$" and insert -- $L_s/(1-B_s)$. --, therefor.

In Column 10, Line 16, delete "$w_{i+1} \geq w_i$" and insert -- $w_{i+1} \leq w_i$ --, therefor.

In Column 10, Line 20, delete "$w_i=(N-i+1)/N$" and insert -- $w_i=(N-i)/N$, --, therefor.

In Column 10, Line 35, delete "$w_i=((N-i+1)/N)^{\alpha}$," and insert -- $w_i=((N-i)/N)^{\alpha}$, --, therefor.

In Column 10, Line 66, delete "EC/Io" and insert -- Ec/Io --, therefor.

In Column 11, Line 55, delete "$(1-N_{sho})(1-P_{sho})$." and insert -- $(1-N_{sho})/(1-P_{sho})$. --, therefor.

In the Claims

In Column 12, Line 43, in Claim 2, delete "where" and insert -- wherein --, therefor.

Signed and Sealed this  
Twenty-fifth Day of November, 2014

Michelle K. Lee  
*Deputy Director of the United States Patent and Trademark Office*

CERTIFICATE OF CORRECTION (continued)
U.S. Pat. No. 8,554,234 B2

In Column 12, Line 55, in Claim 4, delete "where" and insert -- wherein --, therefor.

In Column 13, Line 9, in Claim 7, delete "where" and insert -- wherein --, therefor.

In Column 13, Line 25, in Claim 9, delete "where" and insert -- wherein --, therefor.

In Column 13, Line 39, in Claim 11, delete "where" and insert -- wherein --, therefor.